: US009836851B2

(12) United States Patent
Paik et al.

(10) Patent No.: US 9,836,851 B2
(45) Date of Patent: Dec. 5, 2017

(54) APPARATUS AND METHOD FOR DETECTING MULTIPLE OBJECTS USING ADAPTIVE BLOCK PARTITIONING

(71) Applicant: Chung-Ang University Industry-Academy Cooperation Foundation, Seoul (KR)

(72) Inventors: Joon-Ki Paik, Seoul (KR); Seung-Won Lee, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 105 days.

(21) Appl. No.: 14/979,826

(22) Filed: Dec. 28, 2015

(65) Prior Publication Data

US 2016/0110882 A1    Apr. 21, 2016

Related U.S. Application Data

(63) Continuation of application No. PCT/KR2014/005535, filed on Jun. 23, 2014.

(30) Foreign Application Priority Data

Jun. 25, 2013 (KR) .................. 10-2013-0072943

(51) Int. Cl.
*G06T 7/20* (2017.01)
*G06K 9/00* (2006.01)
(Continued)

(52) U.S. Cl.
CPC ........ *G06T 7/2006* (2013.01); *G06K 9/00771* (2013.01); *G06K 9/4642* (2013.01);
(Continued)

(58) Field of Classification Search
CPC combination set(s) only.
See application file for complete search history.

(56) References Cited

U.S. PATENT DOCUMENTS 7,024,040 B1 *  4/2006  Itokawa ................. G06T 9/001
                                                    348/699
7,095,786 B1 *  8/2006  Schonfeld ............. H04N 19/51
                                                    375/240.16

(Continued)

FOREIGN PATENT DOCUMENTS

JP    2005-079675 A    3/2005
JP    2009-205282 A    9/2009
(Continued)

*Primary Examiner* — Tsung-Yin Tsai
(74) *Attorney, Agent, or Firm* — Mintz Levin Cohn Ferris Glovsky and Popeo, P.C.; Kongsik Kim; Colleen H. Witherell

(57) ABSTRACT

An apparatus for detecting multiple objects using adaptive block partitioning is disclosed. An object contour extracting unit configured to extract a contour information of an object using a local binary pattern LBP and difference image between adjacent images. An adaptive block partitioning unit configured to perform a block partitioning of an object not overlapped based on the extracted contour information. A motion quantization unit configured to calculate a motion orientation histogram MOH of the object by performing N-directional quantization about a motion vector. An object detection unit configured to detect the object using a block of the partitioned object, the contour information and the MOH, and estimate a moving direction of the object after performing labeling the detected object. The apparatus may process effectively data through eight-directional quantization of a motion vector of an object using motion information provided in advance from an ISP chip, detect proper area of the object in the unit of a block with minimizing motion error of the object through the block with adaptive (Continued)

size and orientation histogram, and estimate simultaneously moving direction of the object with the detection of the object.

13 Claims, 14 Drawing Sheets

(51) Int. Cl.
  *G06K 9/46* (2006.01)
  *G06T 7/215* (2017.01)
  *G06T 7/246* (2017.01)
  *G06T 7/44* (2017.01)
(52) U.S. Cl.
  CPC .............. *G06T 7/215* (2017.01); *G06T 7/246* (2017.01); *G06T 7/44* (2017.01); *G06K 2009/4666* (2013.01); *G06T 2207/20012* (2013.01); *G06T 2207/20016* (2013.01); *G06T 2207/20021* (2013.01); *G06T 2207/30232* (2013.01)

(56) References Cited

U.S. PATENT DOCUMENTS

| | | | | |
|---|---|---|---|---|
| 8,965,051 | B2* | 2/2015 | Fang | G06K 9/00355 382/103 |
| 2009/0210362 | A1* | 8/2009 | Xiao | G06K 9/6256 706/12 |
| 2011/0194779 | A1* | 8/2011 | Zhong | G06K 9/00288 382/218 |
| 2011/0311137 | A1* | 12/2011 | Liu | G06K 9/4642 382/173 |
| 2013/0028326 | A1* | 1/2013 | Moriya | H04N 19/176 375/240.16 |
| 2013/0058535 | A1* | 3/2013 | Othmezouri | G06K 9/00369 382/103 |
| 2013/0142426 | A1* | 6/2013 | Kaneda | G06K 9/4642 382/165 |
| 2014/0193071 | A1* | 7/2014 | Cho | G06K 9/00771 382/170 |
| 2014/0376769 | A1* | 12/2014 | Bulan | G06K 9/00771 382/103 |
| 2015/0063708 | A1* | 3/2015 | Sripadarao | G06K 9/00228 382/199 |
| 2015/0262068 | A1* | 9/2015 | Ruan | G06N 5/047 706/12 |
| 2015/0269441 | A1* | 9/2015 | Mj | G06K 9/00744 382/103 |
| 2017/0103535 | A1* | 4/2017 | Mathsyendranath | G06T 3/40 |

FOREIGN PATENT DOCUMENTS

| | | | |
|---|---|---|---|
| KR | 10-2005-0047373 A | | 5/2005 |
| KR | 10-2006-0106490 A | | 10/2006 |
| KR | 101296318 B1 | * | 8/2013 |

* cited by examiner (a)            (b)

(a)

(b)

(a)

(b)

(c)

| Title | Sampled Frame | Type | Resolution |
|---|---|---|---|
| FC |  | Outdoor | 768 × 576 |
| WP |  | Indoor | 768 × 576 |
| PV |  | Outdoor | 768 × 576 |
| PL |  | Outdoor | 1920 × 1080 |

(a)    (b)

(a)

(b)

(c)

(a) original frames (b) estimated foreground using GMM (c) estimated foreground using IGMM (d) the segmentation result of the proposed method (e) labeling and estimated moving directions

APPARATUS AND METHOD FOR DETECTING MULTIPLE OBJECTS USING ADAPTIVE BLOCK PARTITIONING

CROSS-REFERENCE TO RELATED APPLICATIONS

This is a continuation application of International Application No. PCT/KR2014/005535 filed on Jun. 23, 2014, which claims priority to Korean Application No. 10-2013-0072943 filed on Jun. 25, 2013. The applications are incorporated herein by reference.

TECHNICAL FIELD

The present disclosure relates to an apparatus and a method of detecting multiple objects using adaptive block partitioning, and more particularly relates to an apparatus and a method of detecting multiple objects using adaptive block partitioning, which extract an area corresponding to the object by partitioning respective areas of an image frame into blocks with different size and estimate motion information of the object.

BACKGROUND ART

A technique for detecting and tracking an object from an image can be applied to various fields such as an object based robot vision and an intelligent monitoring system, and thus it has been widely studied in a computer vision field.

A background extraction method as a simple method of detecting a moving object has a drawback in that area partitioning for detecting the object is not accurately achieved due to noise and flicker phenomenon. Additionally, a memory with large capacity and great amount of computation are needed for generating the background.

Recently, a system for tracking and providing motion of an image in the unit of a block using an image signal processing ISP system is developed, and it has been applied to a monitoring camera system, etc. However, the system considers the motion for every block so as to estimate the motion of the object, and so its performance is deteriorated in view of velocity and amount of computation.

SUMMARY

One embodiment of the invention provides an apparatus and a method of detecting multiple objects using adaptive block partitioning which estimates effectively an area and a motion of an object using motion information provided in advance from an ISP chip.

Another embodiment of the invention provides a recording medium readable by a computer and having a program for executing a method of detecting multiple objects using adaptive block partitioning which estimates effectively an area and a motion of an object using motion information provided in advance from an ISP chip through the computer.

In one aspect, the invention provides an apparatus for detecting multiple objects using adaptive block partitioning, the apparatus comprising: an object contour extracting unit configured to extract a contour information of an object using a local binary pattern LBP and difference image between adjacent images; an adaptive block partitioning unit configured to perform a block partitioning of an object not overlapped based on the extracted contour information; a motion quantization unit configured to calculate a motion orientation histogram MOH of the object by performing N-directional quantization about a motion vector; and an object detection unit configured to detect the object using a block of the partitioned object, the contour information and the MOH, and estimate a moving direction of the object after performing labeling the detected object.

In another aspect, the invention provides a method of detecting multiple objects performed by an apparatus for detecting multiple objects using adaptive block partitioning, the method comprising: (a) extracting a contour information of an object using local binary pattern LBP and difference image between adjacent images; (b) performing a block partitioning of an object not overlapped based on the extracted contour information; (c) calculating a motion orientation histogram MOH of the object by performing N-directional quantization about a motion vector; and (d) detecting the object using a block of the partitioned object, the contour information and the MOH, and estimating a moving direction of the object after performing labeling the detected object.

In still another aspect, the invention provides a recording medium readable by a computer and having a program for executing the method of detecting multiple objects using adaptive block partitioning according to any one of the aspects through the computer.

An apparatus and a method of detecting multiple objects using adaptive block partitioning according to the invention may process effectively data through eight-directional quantization of a motion vector of an object using motion information provided in advance from an ISP chip, detect proper area of the object in the unit of a block with minimizing motion error of the object through the block with adaptive size and orientation histogram, and estimate simultaneously moving direction of the object with the detection of the object.

DETAILED DESCRIPTION

Hereinafter, various embodiments of an apparatus and a method of detecting multiple objects using adaptive block partitioning according to the invention will be described in detail with reference to accompanying drawings.

A consumer surveillance system records every image inputted from a CCTV camera, and detects a moving object from an image so as to store and analyze an interval of the image having meaningful information because an event by intelligent monitoring is not always performed. Recently, there is a tendency that a function of transmitting moving information of the image as data through estimation of a motion as well as contrast enhancement, defog and low exposure correction has been provided according as hardware performance and monitoring functions of an image signal processing ISP chip are enhanced.

It is difficult to realize a method of detecting an object using conventional background modeling with hardware because much memory space and great amount of computation for training are needed so as to realize the method with the hardware. Additionally, if illumination change is little between adjacent frames, the problem exists in that a ghost phenomenon may occur because the background modeling is sensitive to global illumination change due to usage of long time information.

However, in the event that the object is detected by using motion information, the method of detecting the object is robust in view of global illumination change between adjacent frames, storage space is not needed for modeling, and the method may be realized efficiently with hardware because a training process does not exist.

It is assumed that an apparatus 100 of detecting multiple objects using adaptive block partitioning according to the invention receives simultaneously image information and motion information with 8×8 block size from an ISP chip.

Figure 1:
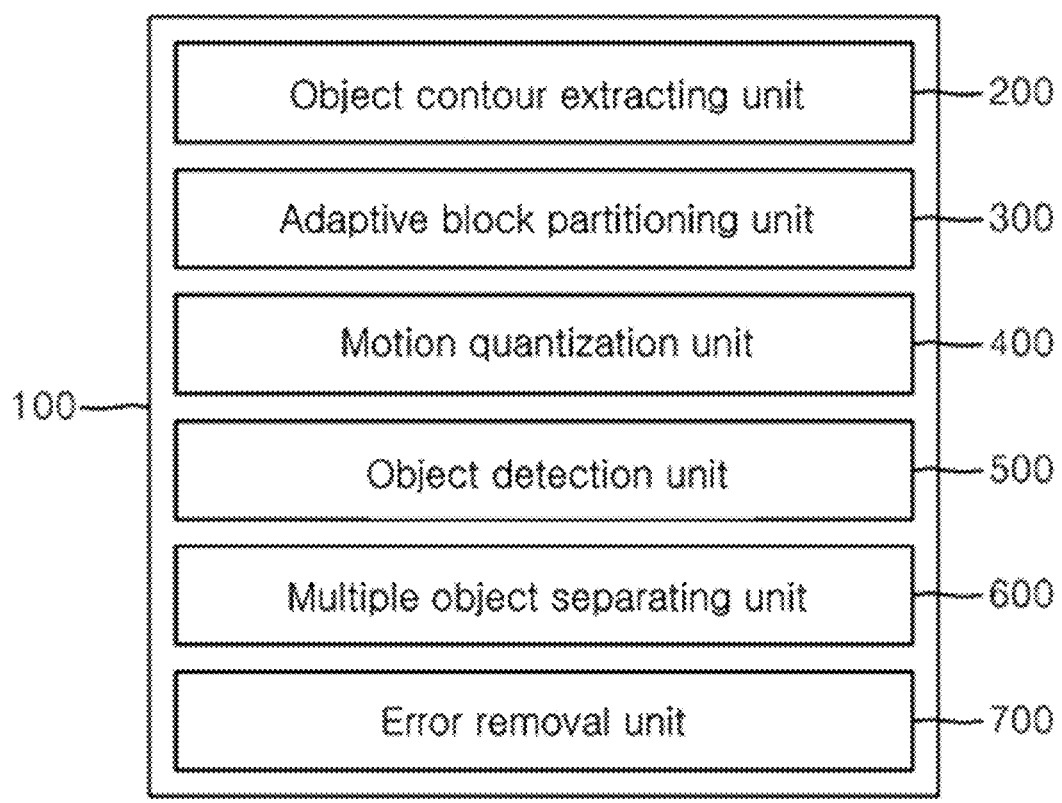
FIG. 1 is a block diagram illustrating an apparatus 100 of detecting multiple objects using adaptive block partitioning according to one embodiment of the invention.

FIG. 1 is a block diagram illustrating an apparatus 100 of detecting multiple objects using adaptive block partitioning according to one embodiment of the invention.

In FIG. 1, the apparatus 100 of the present embodiment may include an object contour extracting unit 200, an adaptive block partitioning unit 300, a motion quantization unit 400, an object detection unit 500, a multiple object separating unit 600 and an error removal unit 700.

Firstly, the motion quantization unit 400 calculates a motion orientation histogram MOH of the object by performing N-directional quantization about motion vector. Here, N may equal to 8. Hereinafter, N is assumed as 8, but is not limited to 8.

The motion vector is quantized in any one of different directions P by using a motion vector provided for respective unit blocks included in an input image frame. The quantization of the motion vector is performed in two reasons. First, it is adequate to separate and classify a moving object by using a part of motion directions. Second, each of motion vectors estimated from a basic block is affected by noise. Accordingly, the apparatus 100 of the invention provides a motion direction classifying method. Specially, $(m_x, m_y)$ means a motion vector estimated for given block, and $\theta$ indicates a direction of the motion vector $(m_x, m_y)$ and $\theta$ may be expressed with following equation 1.

$$\theta = \tan^{-1}\left(\frac{m_y}{m_x}\right) \qquad \text{[Equation 1]}$$

Estimated directions from (P+1) directions are classified as $\{\theta_0, \theta_1, \theta_2, \ldots, \theta_p\}$. Here, $\theta_O$ means a zero motion vector, and $\{\theta_1, \theta_2, \ldots, \theta_p\}$ indicates a set of classified motion directions (P).

$f_t(x,y)$ means tth frame of a video sequence with M×M size, and $B^i_t$ indicates tth block with 8×8 size in the $f_t(x,y)$ frame. Here, each of M and N is assumed as 8, for convenience of description.

If $m^i = (m^i_x, m^i_y)$ is an estimated value of a motion vector of the $B^i$ block, the classified direction may be shown in following equation 2.

$$\theta^j_c = \begin{cases} \theta_0, & \sqrt{(m^i_x)^2 + (m^i_y)^2} < T_\theta \\ \theta_j, & \frac{360}{P}\left(j - \frac{1}{2}\right) \le \theta < \frac{360}{P}\left(j + \frac{1}{2}\right) \end{cases} \qquad \text{[Equation 2]}$$

Figure 2:
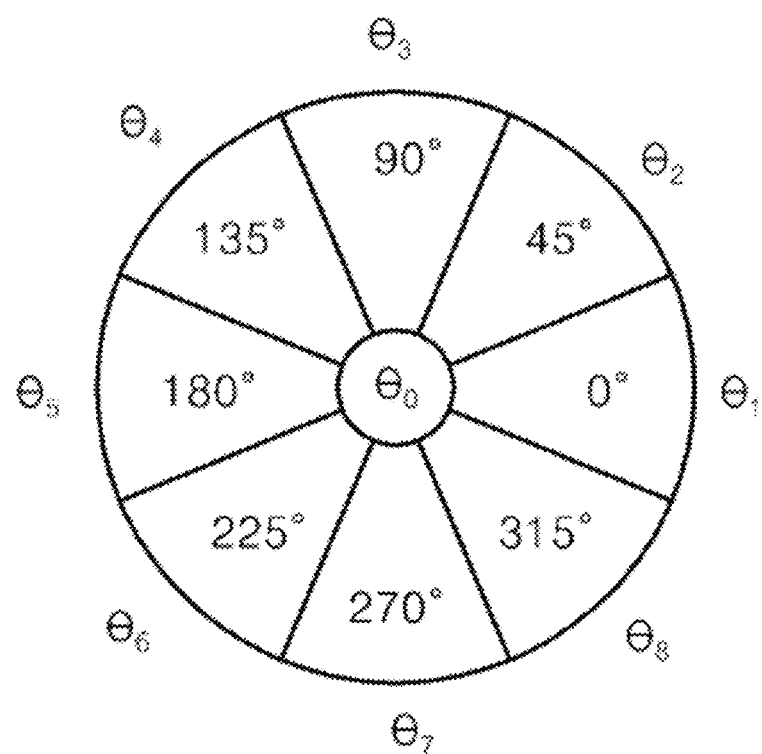
FIG. 2 is a view illustrating nine areas of a motion classified by setting P=8 according to one embodiment of the invention.

Here, j=1, 2, ... P, and $T_\theta$ means a threshold value about a minimum nonzero motion. P may be any number, and it is assumed that P=8 (referring to FIG. 2) in the invention.

Figure 3:
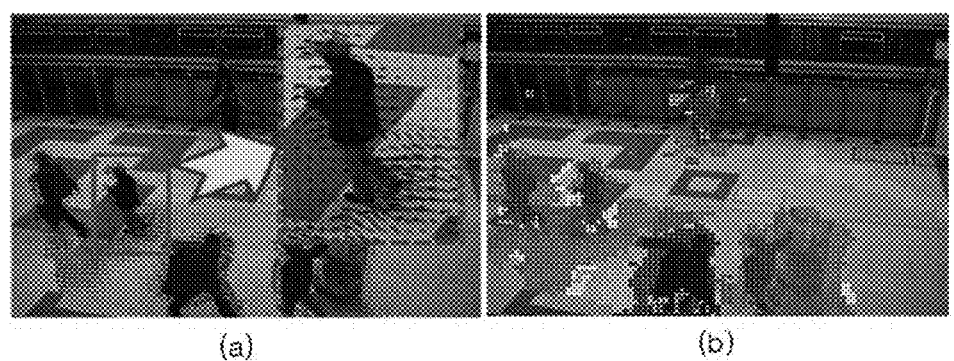
FIG. 3 is a view illustrating result of partitioning an object based on a motion according to one embodiment of the invention.

(a) in FIG. 3 shows an estimated motion vector of the basic block. As shown in (a) in FIG. 3, many motion vectors, of small motion size, measured with error exist. However, in the event that quantized motion vector is applied, a motion, having $T_\theta$, estimated with error may be removed and a motion direction of the object may be effectively estimated as shown in (b) in FIG. 3.

The object contour extracting unit 200 extracts contour information of the object using a local binary pattern LBP and a difference image between adjacent images (frame difference). The adaptive block partitioning unit 300 performs adaptively block partitioning of the object not overlapped based on the extracted contour information of the object.

Figure 4:
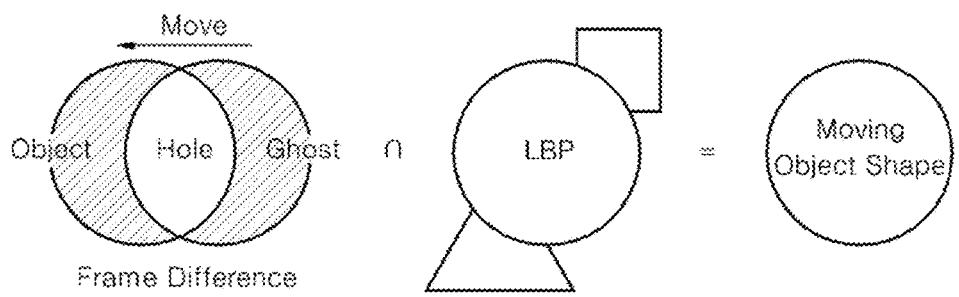
FIG. 4 is a view illustrating concept for detecting shape of a moving object according to one embodiment of the invention.

Since basic information such as a block motion provided from the basic block is very elaborate, it is difficult to indicate the object with size greater than the basic block. Whereas, since the basic information mentioned above is very coarse, it is difficult to show detail of a boundary of the object. To solve the problems, the apparatus 100 of the invention provides an adaptive block partitioning algorithm using together difference image between adjacent images and a local binary pattern LBP image as shown in FIG. 4. The difference image using present image and previous image is simple in view of calculation, and thus it is possible to detect rapidly a moving object.

Here, the difference image D(x,y) is expressed with equation 3.

$$D(x, y) = \begin{cases} 1, & |f_t(x, y) - f_{t-1}(x, y)| > T_D \\ 0, & \text{otherwise} \end{cases} \qquad \text{[Equation 3]}$$

Here, $f_t$, $f_{t-1}$ mean the present image and the previous image, respectively. $T_D$ indicates a predetermined threshold value.

The difference image is intrinsically sensitive to illumination change and shadow and brings about ghost and holes, and thus it is difficult to detect accurately the object. Accordingly, to solve the problem, the apparatus 100 extracts the boundary of the moving object and describes efficiently the texture feature of the image using the LBP which can analyze effectively texture feature of the image. The advantage exists in that the LBP is invariant in rapid calculation and rotation and is robust in illumination change. The LBP is expressed with following equation 4.

$$L_{P,R}(x, y) = \sum_{P=0}^{P-1} s(g_P - g_c) 2^P \quad \text{[Equation 4]}$$

Here, $g_c$ means a gray value of a central pixel $(x,y)$ of local neighborhood, and $g_p$ as a gray value of P locates at a pixel on a circle having the radius R. $s(z)$ is expressed with following equation 5.

$$s(z) = \begin{cases} 1, & z \geq 0 \\ 0, & z < 0 \end{cases} \quad \text{[Equation 5]}$$

In the invention, P and R are respectively 8 and 1 so as to use little memory space in the LBP, and a rotational invariance uniform LBP texture model may be defined with following equation 6.

$$L_{8,1}^{riu2}(x, y) = \begin{cases} \sum_{P=0}^{7} s(g_P - g_c), & U(L_{8,1}(x, y)) \leq 2 \\ 9, & \text{otherwise} \end{cases} \quad \text{[Equation 6]}$$

$$U(L_{8,1}(x, y)) = |s(g_7 - g_c) - s(g_0 - g_c)| + \sum_{P=0}^{7} |s(g_P - g_c) - s(g_{P-1} - g_c)|$$

Superscript "riu2" means that the rotation invariance uniform pattern has an U value less than 2. The uniform pattern in equation 6 is assigned from 0 to 8, and non-uniform pattern is classified as miscellaneous and is assigned to 9.

Figure 5:
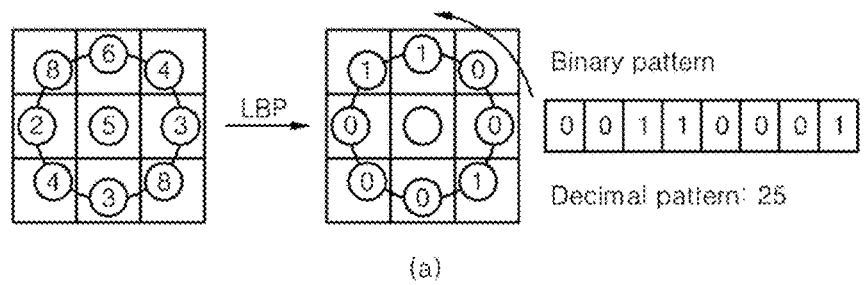
FIG. 5 shows a sample pattern having a label defined as number 1 and a uniform pattern set corresponding to the sample pattern.
Figure 5:
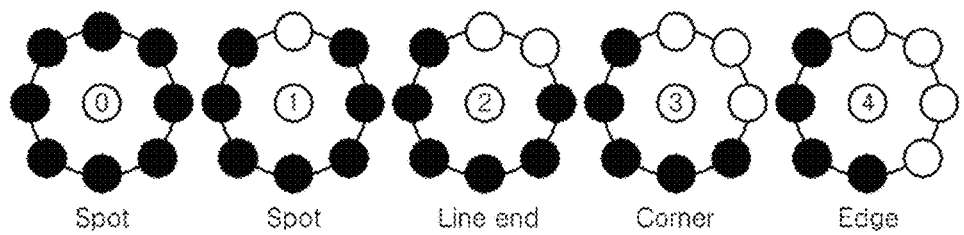
Figure 5:
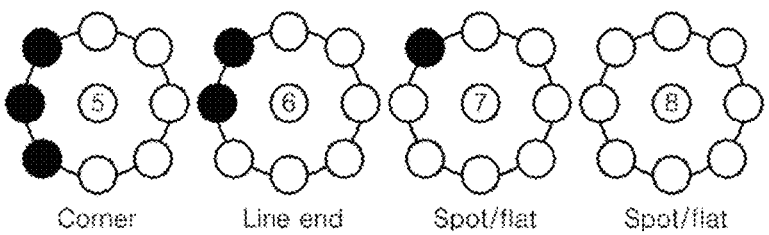

FIG. 5 shows a sample pattern having a label defined as number 1 and a uniform pattern set corresponding to the sample pattern. An approximate value $L_{8,1}^{riu2}$ is used as 3×3 neighborhood operation, which does not require interpolation.

Boundary $S(x,y)$ of the moving object is extracted by using intersection of the difference image and the LBP uniform pattern (line end, corner and edge) through following equation 7. Here, a median filtering is performed to remove noise of the boundary $S(x,y)$.

$$S(x, y) = \begin{cases} 1, & D(x, y) = 1 \cap L_{8,1}^{riu2}(x, y) \in \{2, 3, 4, 5, 6\} \\ 0, & \text{otherwise} \end{cases} \quad \text{[Equation 7]}$$

Figure 6:
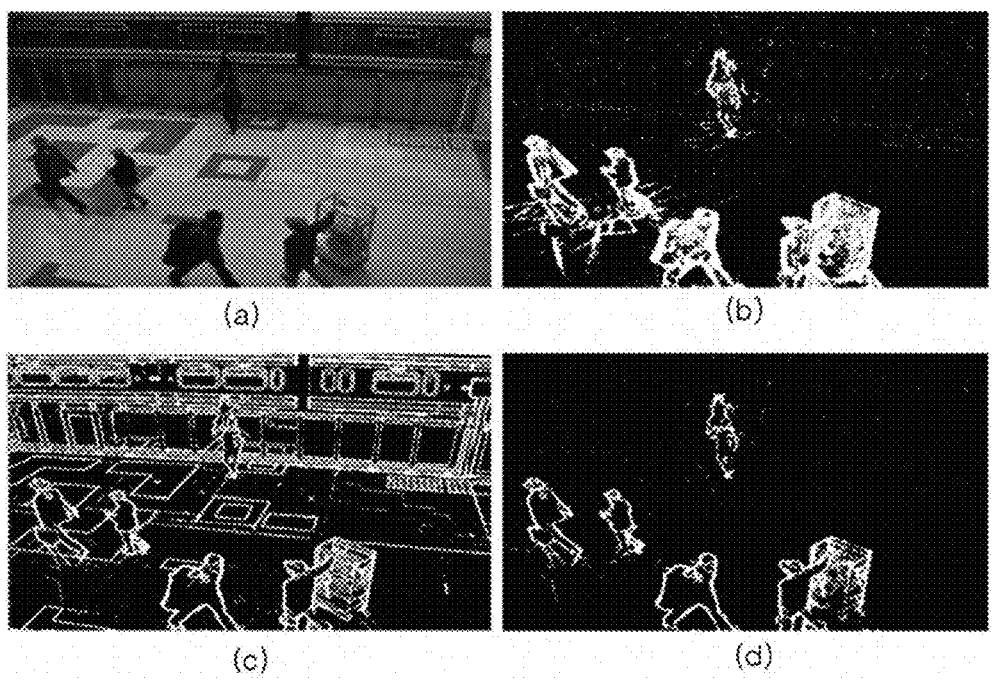
FIG. 6 is a view illustrating one example of a boundary extracted from the moving object.

FIG. 6 is a view illustrating one example of a boundary extracted from the moving object. It is verified through (d) in FIG. 6 that shadow and ghost phenomenon are successfully removed in the difference image.

To remove effectively outlier motions except the motion of the object, the image is partitioned into variable-size blocks suitable for an object area.

Generally, the partitioned 32×32 or 64×64 macro block is divided into smaller size macro blocks to match with the object area. If the macro block including at least one object has shape of the object or boundary information, jth macro block B having a contents value higher than preset threshold value is partitioned into four sub blocks as defined in equation 8.

$$E_j = \begin{cases} 1, & \frac{1}{N_B} \sum_{(x,y) \in B} S(x, y) > T_C \\ 0, & \text{otherwise} \end{cases} \quad \text{[Equation 8]}$$

Here, $N_b$ means total pixel number in the block and uses experimentally $T_C=0.05$. If $E_j$ is 1, $B_j$ are partitioned into four sub blocks.

Figure 7:
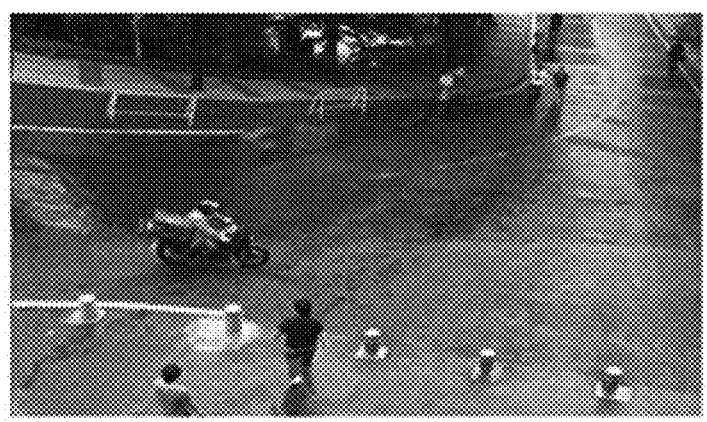
FIG. 7 is a view illustrating result of adaptive block partitioning based on a local binary pattern LBP according to one embodiment of the invention.
Figure 7:
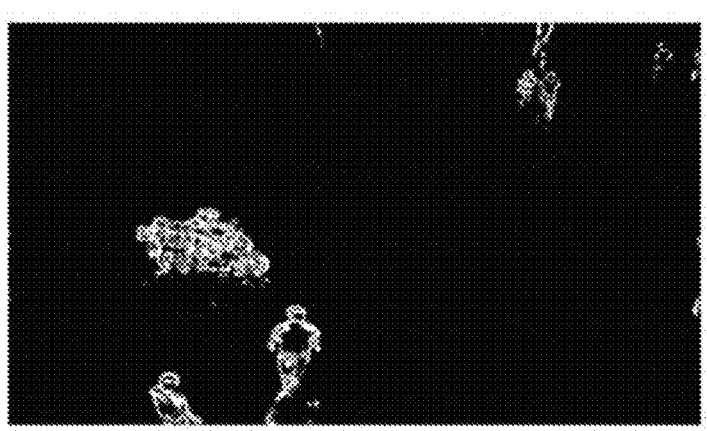
Figure 7:
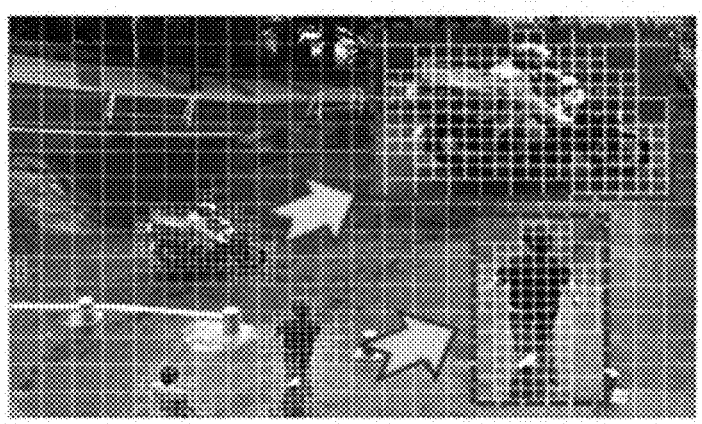

The partitioning process is repeated until smallest sub block with 8×8 size is obtained. Result according to partitioning of a sample block is shown in FIG. 7.

The object detection unit 500 detects the object using the block partitioned adaptively, the contour information of the object and the motion orientation histogram MOH, and estimates labeling and a moving direction of the detected object.

Furthermore, the multiple object separating unit 600 separates overlapped multiple objects by using the MOH. The error removal unit 700 removes error motion using the MOH and the extracted contour information of the object. In another embodiment, the multiple object separating unit 600 and the error removal unit 700 may be included in the object detection unit 500.

Figure 8:
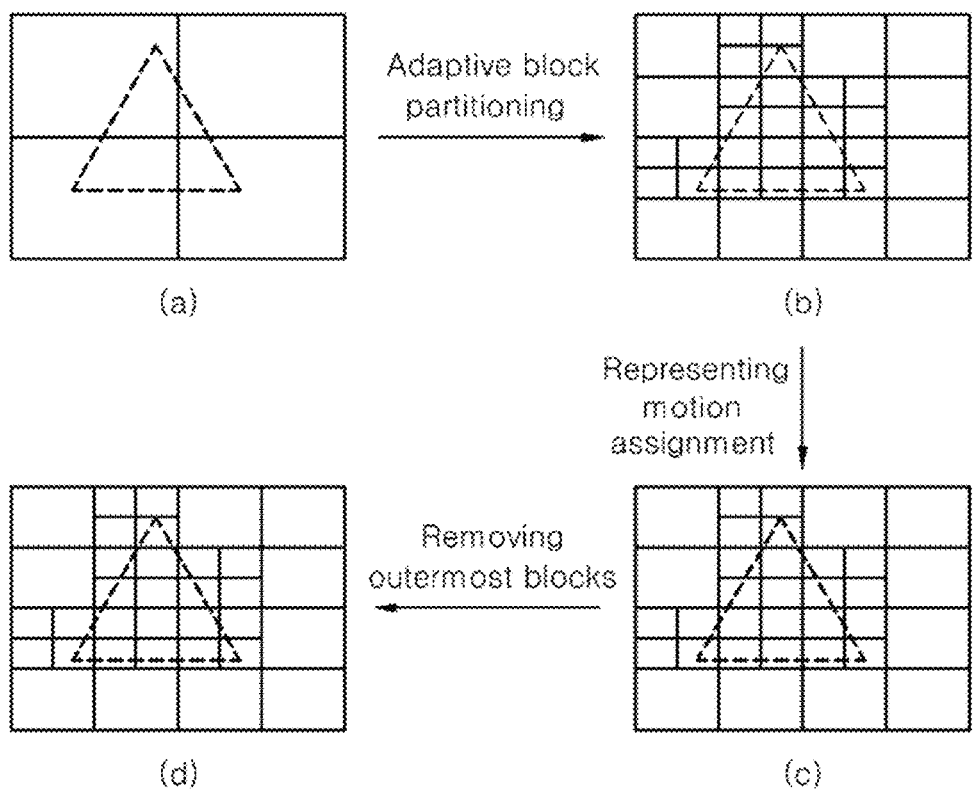
FIG. 8 is a view illustrating concept of the partitioning of the moving object according to one embodiment of the invention.

Basic block motion is used as basic information in the partitioning method of the invention. It is assumed that a block motion model is performed under two-dimensional conversion, static illumination and no-shadow. If the assumption is not satisfied, reliability of estimated motion vector is lowered. Accordingly, motion outlier should be removed so as to perform accurate partitioning. FIG. 8 is a view illustrating concept of the partitioning of the moving object according to one embodiment of the invention.

Result of the partitioning of the block shown in (c) in FIG. 7, which is segmented blocks SB, corresponds to a motion vector for respective SBs in a method to be described below. If the SB has 8×8 size, corresponding basic motion is assigned to a block representing motion. If the SB has size higher than the basic block, the block representing motion is determined as follows. Since the SB having great size includes many basic blocks, most frequent basic motion is assigned to the block representing motion of the SB. If the motion of the SB is higher than a quarter of the number of zero basic motion, corresponding block is regarded as motionless block generated by removing an outermost block not moving. However, false motion block exists still at outside of the object area although the outermost block is first removed.

Accordingly, the invention uses an algorithm shown in following Table 1 to remove false outermost block.

TABLE 1

Algorithm : removal of outermost block motion

```
While(Flag>0)
    θ'= θ
    Flag = 0
    For i=1:MN/64
        If θⁱ is outermost motion block?
            If Eⁱ is less than 4-neighborhood?
                θ'ⁱ = 0, Flag = 1
        θ= θ'
    End
    θ'= θ
    Flag = 0
    For i=1:MN/64
        If θⁱ is outermost motion block?
            If E' is less than 4-neighborhood?
                θ'ⁱ = 0, Flag = 1
        θ= θ'
    End
```

An area partitioned finally is classified as corresponding object area by using a method of labeling in four directions as shown in (d) in FIG. 8. $O_j$ is set as jth labeled object, and $R_i$ is set to an area corresponding to the labeled object. The MOH is calculated for respective object areas by analyzing the motion direction of the object.

If $R_i$ has a basic block $B_j$, the MOH in $O_j$ with P bins is expressed with following equation 9.

$$h_K^j = K \sum_{b=1}^{B_j} \delta(\theta_b - \theta_k), \text{ for } k = 1, 2, \ldots, P \qquad \text{[Equation 9]}$$

Here, $\delta(\cdot)$ is a Kronecker delta function, and K is normalization constant.

Moving direction of $O_j$ object is defined with following equation 10.

$$d_j = \underset{\theta_k}{\operatorname{argmax}} h_k^j, \text{ for } k = 1, 2, \ldots, P \qquad \text{[Equation 10]}$$

In case of an object of which the MOH has unimodal, corresponding object area may be regarded as an object in one direction. In case of an object of which the MOH has multimodal, it may be estimated that objects in different directions is labeled to one object.

In this case, discriminant of modality is expressed with following equation 11.

$$m_k^j = \begin{cases} 1, & h_k^j - h_{k-1}^j > 0 \cap h_k^j - h_{k+1}^j < 0 \cap h_k^{j>T_h} \\ 0, & \text{otherwise} \end{cases} \qquad \text{[Equation 11]}$$

for k=1, 2, . . . , P

Here, $T_h$ means a modality threshold value, for example $T_h$=0.3 If k equals to 1 in equation 11, k−1 is regarded as P. If total sum of $m_k^j$ component is higher than 1, it is discriminated that the object area includes an object in various directions.

Figure 9:
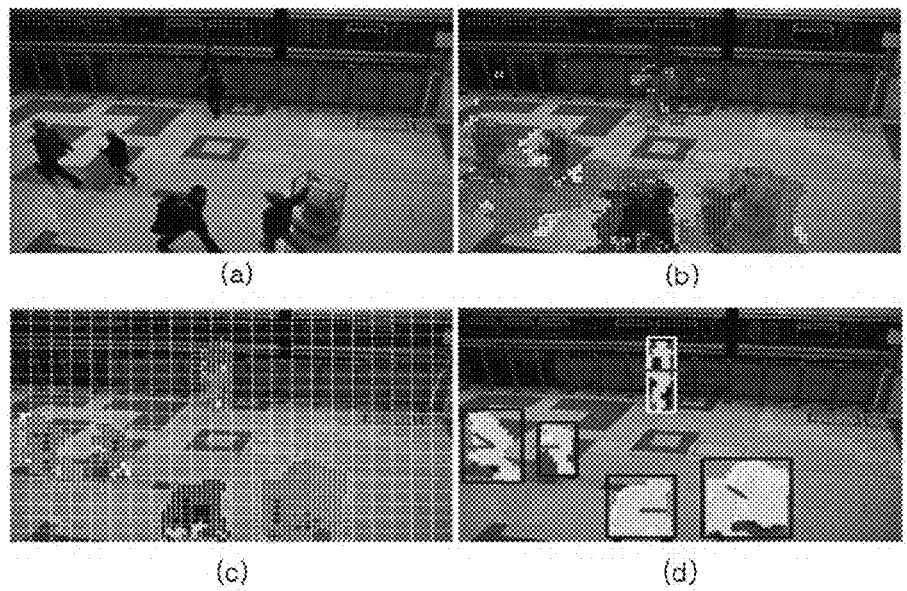
FIG. 9 is a view illustrating analysis result of labeling and moving direction of the object.

FIG. 9 is a view illustrating analysis result of labeling and moving direction of the object. It is verified through (c) in FIG. 9 that the object area is detected by the provided partitioning of the moving object. Detection result of the area and the direction of the object through the object labeling is shown in (d) in FIG. 9, and it is verified that an object moving in opposite direction may be detected by using an object in multiple directions. That is, overlapped objects moving in different directions are shown in a yellow box in (d) in FIG. 9.

Figure 10:
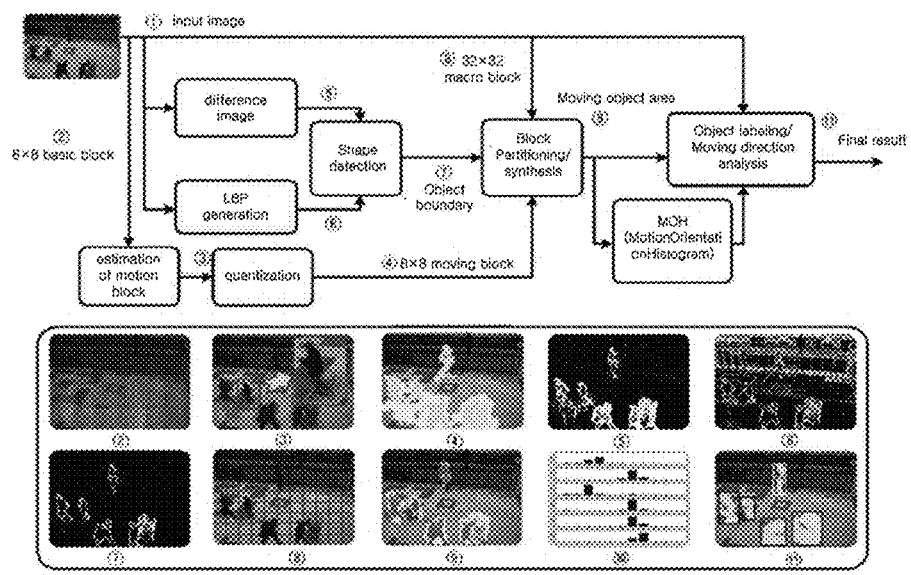
FIG. 10 is a flowchart illustrating a method of detecting multiple objects using adaptive block partitioning according to eon embodiment of the invention.

Flowchart of the above method of detecting multiple objects using adaptive block partitioning of the invention is illustrated in FIG. 10.

Figure 11:
FIG. 11 is a view illustrating different test sequences for testing performance of the invention.
Figure 11:
Figure 11:
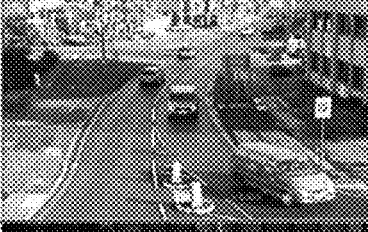
Figure 11:

Performance evaluation test is progressed based on following four different scenarios. As shown in FIG. 11, the test is performed under different scenarios of i) in-house fence climbing (FC) video, ii) the PETS 2006 dataset for walking pedestrians (WP), iii) the AVSS dataset parking vehicles (PV) and iv) in-house parking lot (PL) video. Sequences corresponding to i), ii) and iii) have M×N=768×576 resolution, and sequence corresponding to iv) has 1920×1980 resolution. Additionally, a personal computer PC including 3.07 GHz CPU and 4 GB RAM is used for the test.

A Lucas and Kanade (LK) optical flow motion detection algorithm is used in a basic motion vector simulation, and it is provided as downscaled input image from an ISP chip in real environment.

Figure 12:
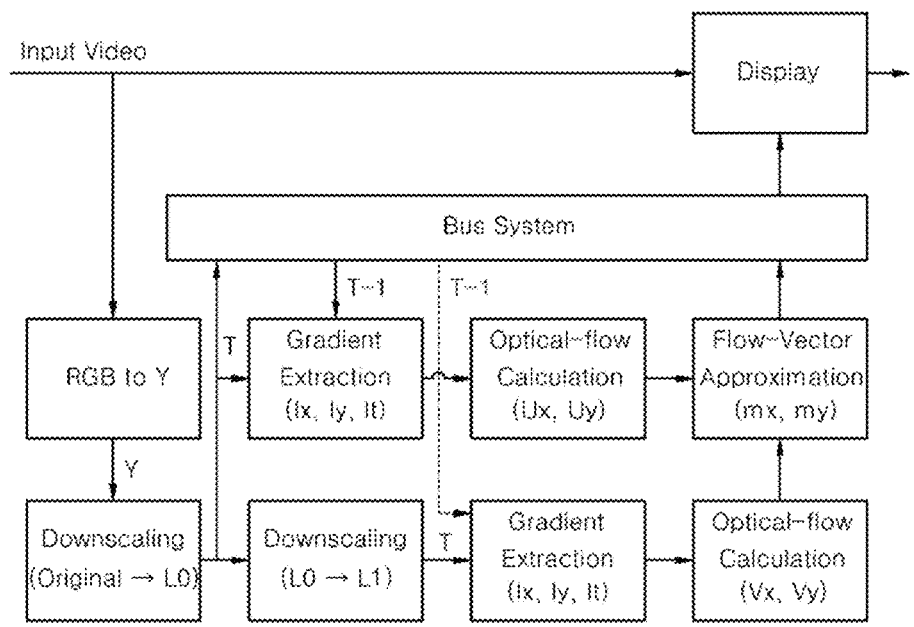
FIG. 12 is a view illustrating structure of a FPGA system using an LK optical flow based basic motion estimation.

The basic block motion detection algorithm is performed using FPGAs in a motion estimation performing and a processing time test. This FPGA system has a structure shown in FIG. 12, it uses level 0 and level 1 from the downscaled input image having 70%~90% nonzero motion vector. An output motion vector is determined by using weight sum of a motion vector estimated for each of levels defined by following equation 12.

$$m(x,y)=\alpha \cdot u(x,y)+\beta \cdot v(x,y) \qquad \text{[Equation 12]}$$

Here, $\alpha$ and $\beta$ mean weighting values, and u and v indicate motion vectors corresponding to level 0 and level 1, respectively.

Figure 13:
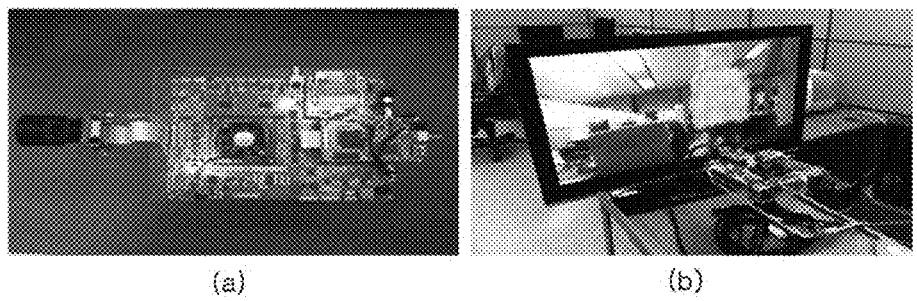
FIG. 13 is a view illustrating a FPGA board and a HD monitor connected to the FPGA board according to one embodiment of the invention.

FIG. 13 is a view illustrating a high definition HD camera module and a FPGA board including a HD monitor, with 1920×1080 resolution, for showing in real time a process of partitioning the moving object.

Figure 14:
FIG. 14 is a view illustrating an image frame taken by using the FPGA board according to one embodiment of the invention.
Figure 14:
Figure 14:

A video frame captured directly from the FPGA board is shown in FIG. 14. It is verified through (b) and (c) in FIG. 14 that quantized eight directional motion is marked on the moving object.

It is set in the test that a motion threshold value $T_\theta$=0.4 and a difference image threshold value $T_D$=3. The basic motion is estimated by using 8×8 block, and an image having 768×576 resolution has 6912 (MN/64=6,912) blocks. Only one arctangent and one magnitude operation are needed for each of the blocks, so as to classify the motion direction.

A computation cost for detecting shape of the moving object requires one difference image and eight LBP operations in the unit of a pixel, without any multiplication. (1+8)MN≈4×10⁶ operations are totally needed.

The method of the invention is compared with a background generation based method using an original Gaussian synthesis model GMM and an upgrade version IGMM of the GMM. The method uses different four Gaussian functions based on the GMM and the IGMM.

Figure 15:
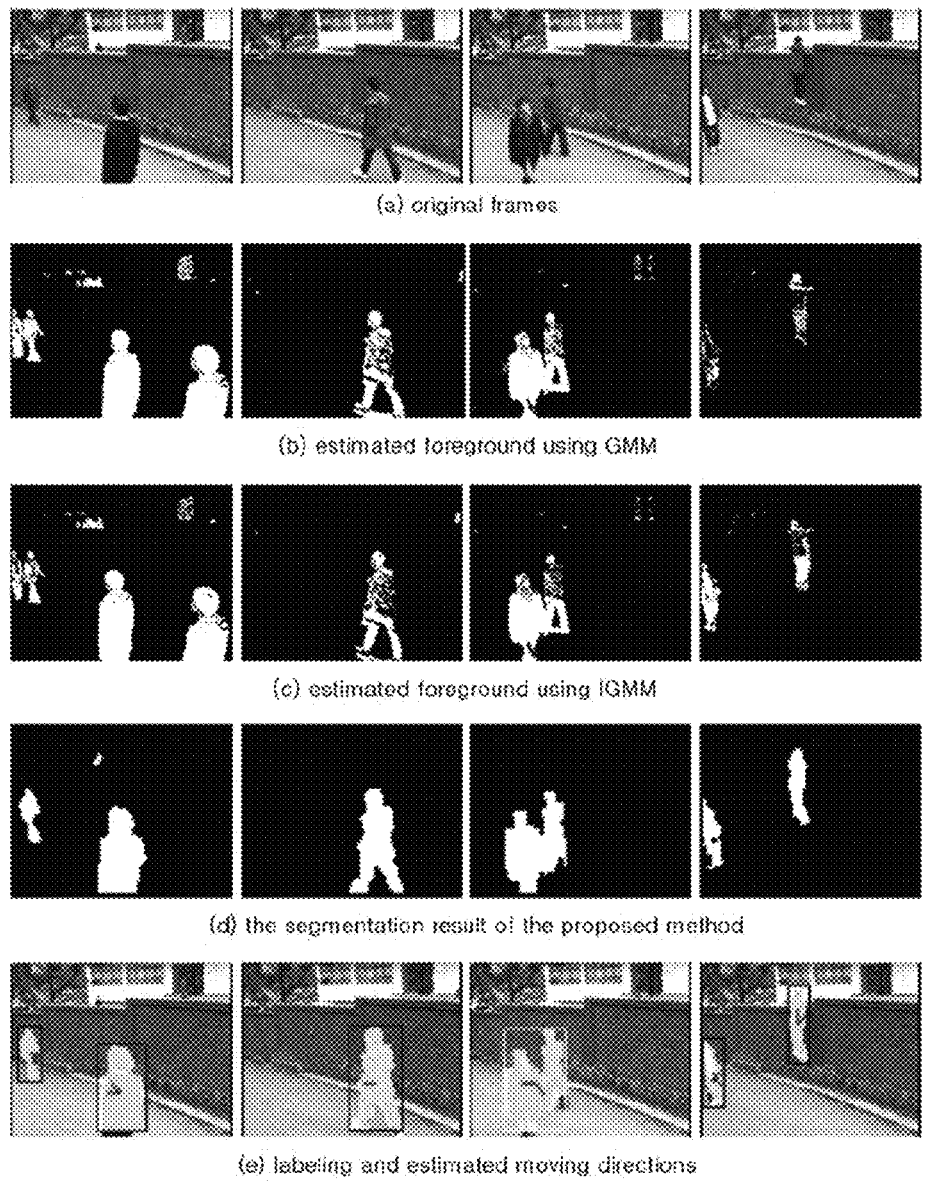
FIG. 15 to FIG. 18 are views illustrating result image obtained by applying the method of the invention to an FC sequence, a WP sequence, a PV sequence and a PL sequence.

Test result for the FC (fence climbing) image in FIG. 11 is shown in FIG. 15. As shown in (b) and (c) in FIG. 15, the conventional method brings out incorrect partitioning of the moving object owing to instable background initiation step between the object and the background and obscure color. However, it is verified through (d) in FIG. 15 that the method of the invention partitions distinctly the moving object in the same video image.

Figure 16:
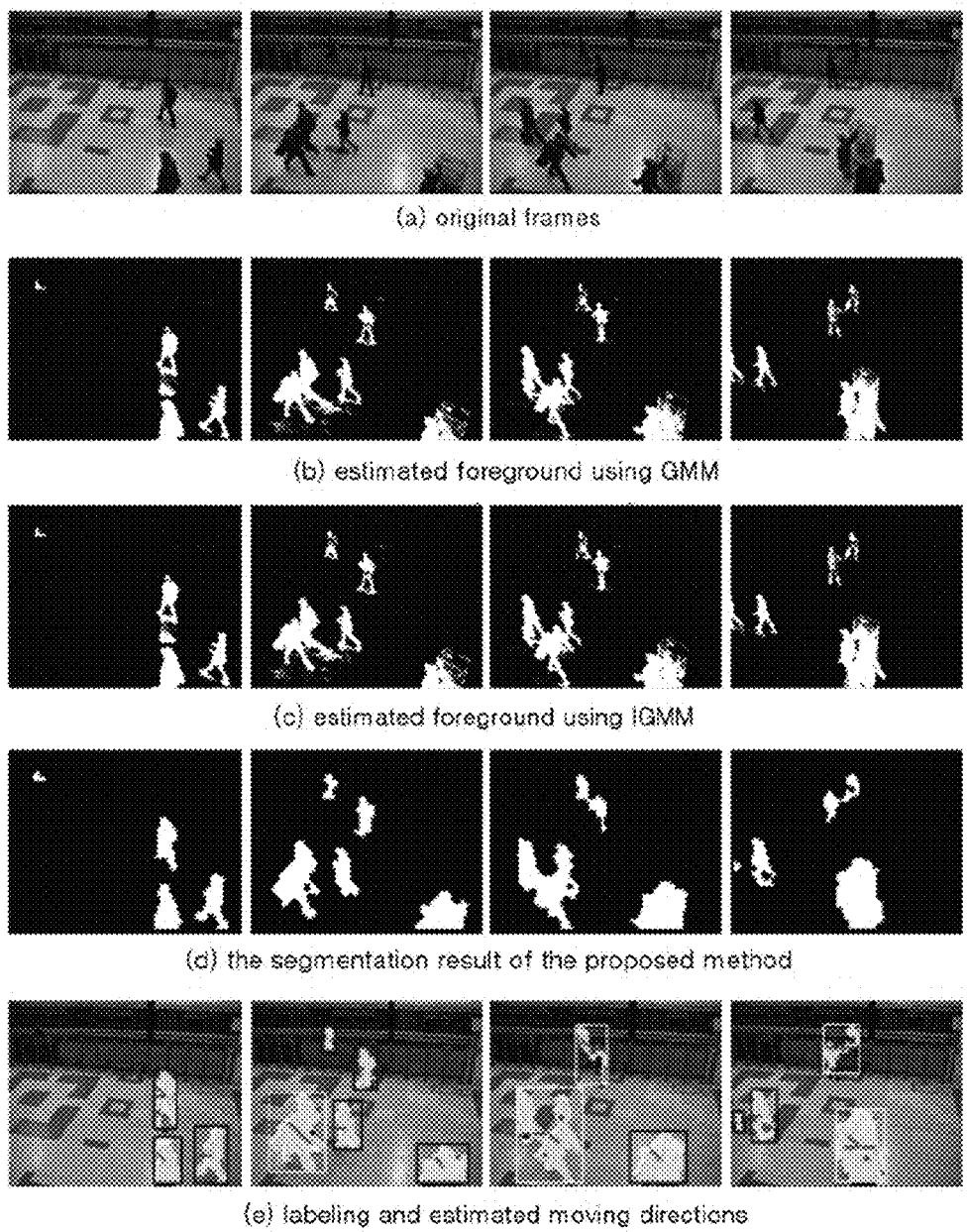

Test result for the WP (walking pedestrian) image in FIG. 11 is illustrated in FIG. 16. It is verified through (e) in FIG. 16 that shadow of the object is removed and the object area in multi directions is successfully detected.

Figure 17:
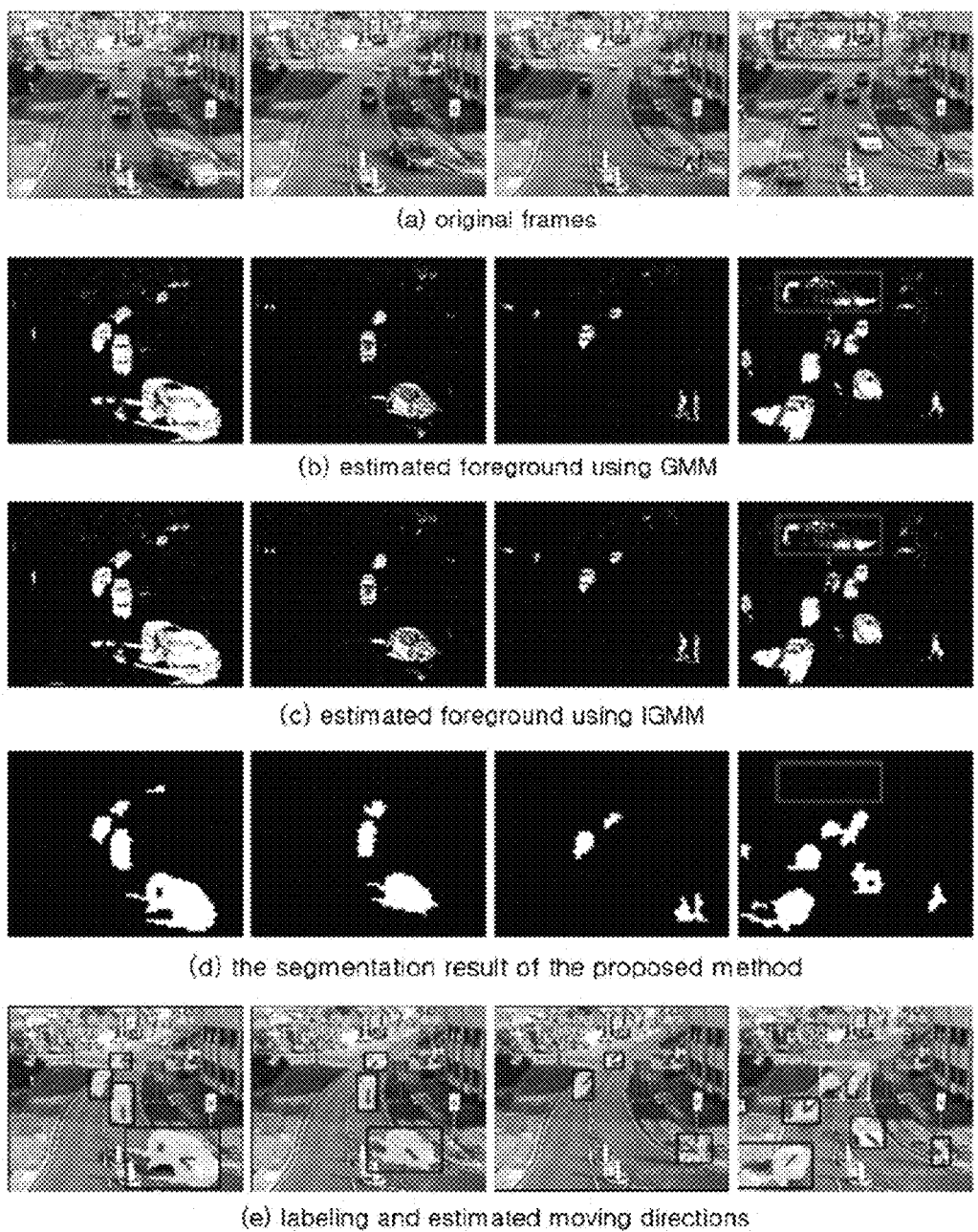

Test result for the PV (parking vehicles) image in FIG. 11 is shown in FIG. 17. Referring to (b) and (c) in FIG. 17, illumination change occurs due to moving cloud, and thus false background is brought out when the conventional method is employed. However, it is verified through (d) in FIG. 17 that the object area is correctly detected although the illumination change occurs in the event that the method of the invention is applied.

Figure 18:
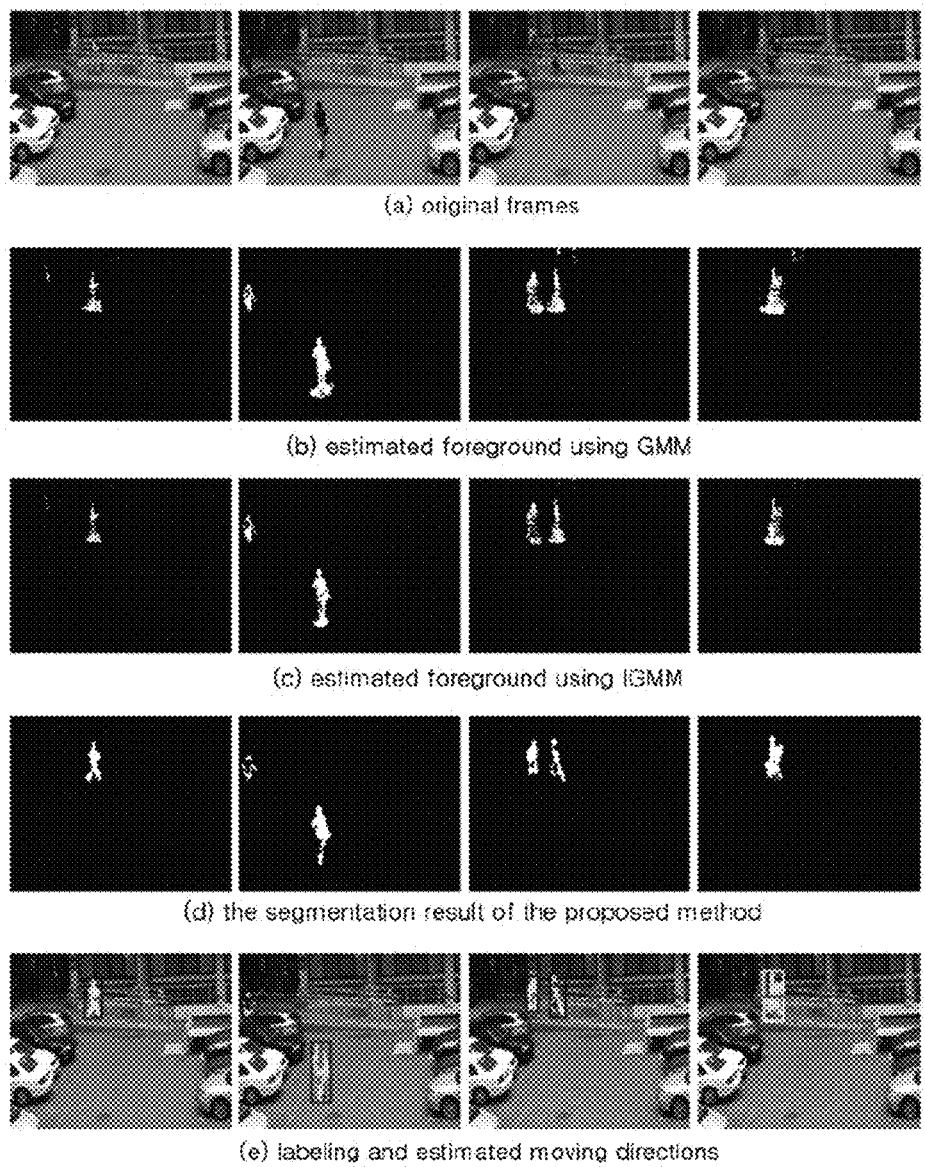

Test result for the PL (parking lot) image in FIG. 11 is illustrated in FIG. 18. A PL sequence is taken by a HD camera having 1920×1080 resolution. It is verified that the moving object is detected in the PL sequence when the method of the invention is applied. This shows that the method of the invention is suitable for high definition video environment.

The partitioning (segmentation) results of the moving object using the conventional GMM and IGMM are similar, but calculation time in the IGMM is shorter than that in the GMM. However, the problem exists in that the calculation time in the IGMM has considerably increased according as size of an image is augmented.

296.581 ms is averagely taken for each of frames in the IGMM, but 61.041 ms is taken for processing a video having 1920×1080 resolution in the unit of the frame, except the basic motion estimation provided directly from the ISP chip when the method of the invention is applied.

It is assumed that a camera should be statically kept and illumination change can't be processed in the background modeling. If this assumed premise is cancelled, the background modeling based on the method of partitioning the object can't detect the moving object until proper background is again generated. Accordingly, the method of the invention may have excellent processing ability compared with the conventional background modeling method, and have rapid processing velocity by five times compared with the conventional IGMM method when the method of the invention and the IGMM are used in a high definition video monitoring system.

TABLE 2

| method | Image resolution | |
| --- | --- | --- |
| | 768 × 576 | 1920 × 1080 |
| GMM | 143.102 ms | 546.375 ms |
| IGMM | 60.340 ms | 295.581 ms |
| Method of the invention | 15.786 ms | 61.041 ms |

Briefly, the apparatus and the method of detecting multiple object using adaptive block partitioning according to the invention may partition effectively the moving object by using only eight-directional quantized data of the image and the motion information provided from the ISP chip, and provide basic information for high-level processing for the purpose of tracking of the object and action analysis in the monitoring system, under it is embedded later in the ISP chip.

Also, the technical features described above can be implemented in the form of codes that may be performed using various computer means and can be read in a computer-readable medium. Such a computer-readable medium includes every kind of recording apparatus which can store data to be read by a computer system. Examples of a computer-readable medium may include a ROM, a RAM, a CD-ROM, magnetic tapes, floppy disks, optical data storage devices, etc., and be achieved in a form of carrier wave (transmission through Internet). The computer-readable medium may be distributed in the computer system where elements are connected via wire/wireless communication network, store a code readable by the computer and execute the code.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. An apparatus for detecting multiple objects using adaptive block partitioning, including a memory storing program instructions and a processor executing the stored program instructions to control operation of the apparatus, the apparatus comprising:
   an object contour extracting unit operatively coupled to the processor, configured to extract a contour information of an object using a local binary pattern (LBP) and difference image between adjacent images;
   an adaptive block partitioning unit operatively coupled to the processor, configured to perform a block partitioning of an object not overlapped based on the extracted contour information;
   a motion quantization unit operatively coupled to the processor, configured to calculate a motion orientation histogram (MOH) of the object by performing N-directional quantization about a motion vector; and
   an object detection unit operatively coupled to the processor, configured to detect the object using a block of the partitioned object, the contour information and the MOH, and estimate a moving direction of the object after performing labeling the detected object.

2. The apparatus of claim 1, further comprising:
   a multiple object separating unit configured to separate overlapped multiple objects by using the MOH.

3. The apparatus of claim 2, further comprising:
   an error removal unit configured to remove an error motion by using the MOH and the extracted contour information of the object.

4. The apparatus of claim 1, wherein the adaptive block partitioning unit performs repeatedly a block partitioning process until a sub block having smallest size is obtained, and removes outermost block discriminated as a block not moving.

5. The apparatus of claim 1, wherein the N equals to 8.

6. The apparatus of claim 1, wherein the object detection unit receives an image information and a motion vector information from an image signal processing (ISP) chip.

7. A method of detecting multiple objects performed by an apparatus for detecting multiple objects using adaptive block partitioning, including a memory storing program instructions and a processor executing the stored program instructions to control operation of the apparatus, the method comprising:
   (a) extracting a contour information of an object using local binary pattern (LBP) and difference image between adjacent images;
   (b) performing a block partitioning of an object not overlapped based on the extracted contour information;

(c) calculating a motion orientation histogram MOH of the object by performing N-directional quantization about a motion vector; and (d) detecting the object using a block of the partitioned object, the contour information and the MOH, and estimating a moving direction of the object after performing labeling the detected object.

8. The method of claim 7, further comprising:

(e) separating overlapped multiple objects by using the MOH.

9. The method of claim 8, further comprising:

(f) removing an error motion by using the MOH and the extracted contour information of the object.

10. The method of claim 7, wherein the step of (b) step includes performing repeatedly a block partitioning process until a sub block having smallest size is obtained and removing outermost block discriminated as a block not moving.

11. The method of claim 7, wherein the N equals to 8.

12. The method of claim 7, wherein the step of (d) includes receiving an image information and a motion vector information from an image signal processing (ISP) chip.

13. A recording medium readable by a non-transitory computer-readable and having a program for executing the method of detecting multiple objects using adaptive block partitioning according to any one of claim 7 to claim 12 through the computer.

\* \* \* \* \*